United States Patent
Duggal et al.

(10) Patent No.: US 10,108,543 B1
(45) Date of Patent: Oct. 23, 2018

(54) EFFICIENT PHYSICAL GARBAGE COLLECTION USING A PERFECT HASH VECTOR

(71) Applicant: EMC IP Holding Company LLC, Hopkinton, MA (US)

(72) Inventors: Abhinav Duggal, Santa Clara, CA (US); Tony Wong, Milpitas, CA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 24 days.

(21) Appl. No.: 15/389,421

(22) Filed: Dec. 22, 2016

Related U.S. Application Data

(60) Provisional application No. 62/399,685, filed on Sep. 26, 2016.

(51) Int. Cl.
*G06F 12/02* (2006.01)
*G06F 3/06* (2006.01)

(52) U.S. Cl.
CPC .......... *G06F 12/0253* (2013.01); *G06F 3/065* (2013.01); *G06F 3/067* (2013.01); *G06F 3/0608* (2013.01); *G06F 3/0619* (2013.01); *G06F 3/0641* (2013.01); *G06F 2212/702* (2013.01)

(58) Field of Classification Search
CPC .. G06F 12/0253; G06F 3/0608; G06F 3/0619; G06F 3/0641; G06F 3/065; G06F 3/067; G06F 2212/702
USPC ........................................................ 711/162
See application file for complete search history.

(56) References Cited

U.S. PATENT DOCUMENTS

| | | | | |
|---|---|---|---|---|
| 8,589,447 | B1* | 11/2013 | Grunwald | G06F 17/30088 707/638 |
| 9,189,414 | B1* | 11/2015 | Shim | G06F 12/08 |
| 2013/0097380 | A1* | 4/2013 | Colgrove | G06F 17/30159 711/118 |
| 2014/0181575 | A1* | 6/2014 | Kalach | G06F 11/1415 714/6.11 |

OTHER PUBLICATIONS

Fabiano C. Botelho, Rasmus Pagh, Nivio Ziviani, Practical perfect hashing in nearly optimal space Inf. Syst., 38 (1) (2013), pp. 108-131 (Year: 2013).*

* cited by examiner

*Primary Examiner* — Mano Padmanabhan
*Assistant Examiner* — William E. Baughman
(74) *Attorney, Agent, or Firm* — Staniford Tomita LLP

(57) ABSTRACT

Embodiments are directed to perfect physical garbage collection (PPGC) process that uses a perfect hash vector instead of large Bloom filters of the regular physical garbage collection process for the live and live instance vectors and consolidates both into a single live vector using the perfect hash vector. A method of PPGC includes an analysis phase walking an index containing a mapping of fingerprints to a container ID for a plurality of containers and building a perfect hash function for a walk vector and a live vector, wherein the live vector uses a perfect hash vector, an enumeration phase inserting live segments in memory into the perfect hash vector, a select phase traversing the plurality of containers and selecting containers that meet a defined liveness threshold and a copy phase copying live segments out of the selected containers.

20 Claims, 8 Drawing Sheets

US 10,108,543 B1

EFFICIENT PHYSICAL GARBAGE COLLECTION USING A PERFECT HASH VECTOR

CROSS-REFERENCE TO RELATED APPLICATIONS

The present application claims the benefit of the U.S. Provisional Application No. 62/399,685 entitled "Efficient Physical Garbage Collection" and filed on Sep. 26, 2016.

TECHNICAL FIELD

This invention relates generally to maintaining stored data, and more particularly to systems and methods for garbage collection that reclaims and consolidates space within a data storage system.

COPYRIGHT NOTICE

A portion of the disclosure of this patent document contains material that is subject to copyright protection. The copyright owner has no objection to the facsimile reproduction by anyone of the patent disclosure, as it appears in the Patent and Trademark Office patent files or records, but otherwise reserves all copyright rights whatsoever.

BACKGROUND OF THE INVENTION

Most storage systems that do not perform overwrite data in place need a mechanism for garbage collection ("GC"), that is, reclaiming storage that is no longer in use while preserving live data. Since the advent of "log-structured file systems", there has been work to optimize the cost of cleaning the file system to consolidate live data and make room for large contiguous areas of new data to be written. Most past efforts in this area have been to optimize the input/output (I/O) costs, as any effort to read and rewrite data reduces the throughput available for new data.

With deduplicating storage systems there is an additional complication: that of identifying what data is live in the first place. As new data is written to a system, duplicate chunks are replaced with references to previously stored data, so it is essential to track such new references. Approaches that require the storage system to be read-only during GC eventually give way to more complicated real-time reference management, using techniques such as epochs to control referential integrity.

Deduplicating systems face other challenges with respect to GC. As workloads evolve, some systems experience very different usage than traditional deduplicating backup storage systems were intended to support. Advanced backup systems are designed to handle a relatively low number (thousands) of relatively large files (Gigabytes), namely the full and incremental backups that have been the mainstay of computer backups for decades. In addition, the expectation is that the logical space, i.e., the set of files that could be written and read by applications such as a backup application, would only be a relatively small factor larger than the physical space, i.e., the storage consumed after deduplication. Typical deduplication ratios have been assumed to be in the neighborhood of 10-20 times or less, but this has been changing dramatically in some environments. Thus, new technology trends are increasing the deduplication ratio as well as the numbers of files represented in storage systems.

One current system uses a mark-and-sweep algorithm that determines the set of live chunks reachable from the live files and then frees up unreferenced space. There are also other alternatives such as reference counting.

In prior systems, GC was performed at the logical level, meaning the system analyzed each file to determine the set of live chunks in the storage system. The shift to using individual file-level backups, rather than tar-like aggregates, meant that the number of files in some systems increased dramatically. This resulted in high GC overhead during the mark phase, especially due to the amount of random I/O required. At the same time, the high deduplication ratios in some systems resulted in the same live chunks being repeatedly identified, again resulting in high GC overhead. The time to complete a single cycle of GC in such systems could be on the order of several days. Since backing up data concurrently with GC results in contention for disk I/O and processing, there is a significant performance implication to such long GC cycles; in addition, a full system might run out of capacity while awaiting space to be reclaimed.

Therefore, there is a need to redesign GC to work at the physical level: instead of GC enumerating all live files and their referenced chunks, entailing random access to all files, GC performs a series of sequential passes through the physical storage containers containing numerous chunks. Because the I/O pattern is sequential and because it scales with the physical capacity rather than the deduplication ratio or the number of individual files, the overhead is relatively constant and proportional to the size of the system.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions. EMC, Data Domain, Data Domain Restorer, and Data Domain Boost are trademarks of Dell EMC Corporation.

BRIEF DESCRIPTION OF THE DRAWINGS

In the following drawings like reference numerals designate like structural elements. Although the figures depict various examples, the one or more embodiments and implementations described herein are not limited to the examples depicted in the figures.

DETAILED DESCRIPTION

Figure 1:
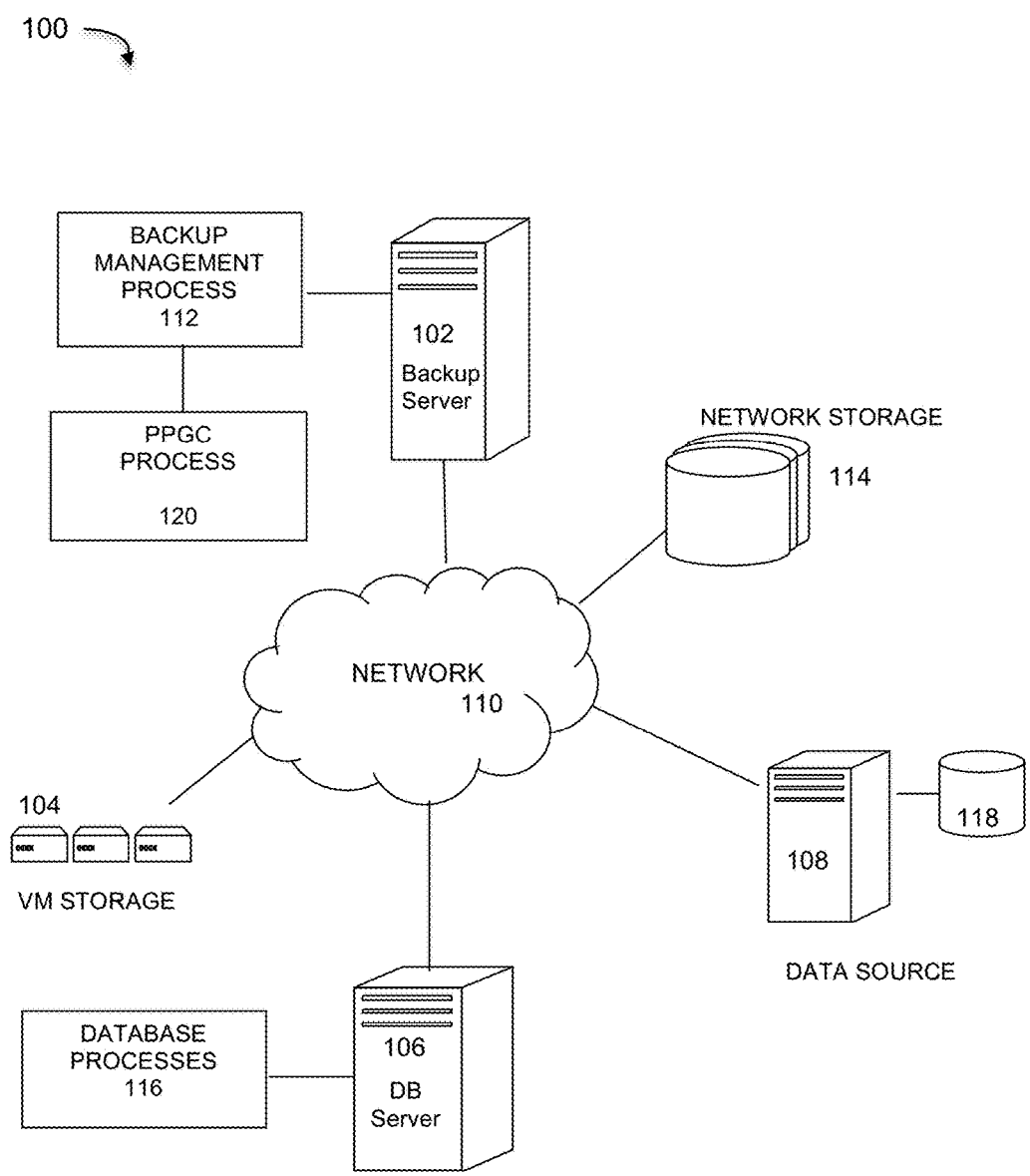
FIG. 1 is a diagram of a large-scale network implementing a perfect physical garbage collection process, under some embodiments.

A detailed description of one or more embodiments is provided below along with accompanying figures that illustrate the principles of the described embodiments. While aspects of the invention are described in conjunction with such embodiment(s), it should be understood that it is not limited to any one embodiment. On the contrary, the scope is limited only by the claims and the invention encompasses numerous alternatives, modifications, and equivalents. For the purpose of example, numerous specific details are set forth in the following description in order to provide a thorough understanding of the described embodiments, which may be practiced according to the claims without some or all of these specific details. For the purpose of clarity, technical material that is known in the technical fields related to the embodiments has not been described in detail so that the described embodiments are not unnecessarily obscured.

It should be appreciated that the described embodiments can be implemented in numerous ways, including as a process, an apparatus, a system, a device, a method, or a computer-readable medium such as a computer-readable storage medium containing computer-readable instructions or computer program code, or as a computer program product, comprising a computer-usable medium having a computer-readable program code embodied therein. In the context of this disclosure, a computer-usable medium or computer-readable medium may be any physical medium that can contain or store the program for use by or in connection with the instruction execution system, apparatus or device. For example, the computer-readable storage medium or computer-usable medium may be, but is not limited to, a random access memory (RAM), read-only memory (ROM), or a persistent store, such as a mass storage device, hard drives, CDROM, DVDROM, tape, erasable programmable read-only memory (EPROM or flash memory), or any magnetic, electromagnetic, optical, or electrical means or system, apparatus or device for storing information. Alternatively or additionally, the computer-readable storage medium or computer-usable medium may be any combination of these devices or even paper or another suitable medium upon which the program code is printed, as the program code can be electronically captured, via, for instance, optical scanning of the paper or other medium, then compiled, interpreted, or otherwise processed in a suitable manner, if necessary, and then stored in a computer memory. Applications, software programs or computer-readable instructions may be referred to as components or modules. Applications may be hardwired or hard coded in hardware or take the form of software executing on a general purpose computer or be hardwired or hard coded in hardware such that when the software is loaded into and/or executed by the computer, the computer becomes an apparatus for practicing the invention. Applications may also be downloaded, in whole or in part, through the use of a software development kit or toolkit that enables the creation and implementation of the described embodiments. In this specification, these implementations, or any other form that the invention may take, may be referred to as techniques. In general, the order of the steps of disclosed processes may be altered within the scope of the invention.

Some embodiments of the invention involve software development and deployment in a distributed system, such as a very large-scale wide area network (WAN), metropolitan area network (MAN), or cloud based network system, however, those skilled in the art will appreciate that embodiments are not limited thereto, and may include smaller-scale networks, such as LANs (local area networks). Thus, aspects of the one or more embodiments described herein may be implemented on one or more computers executing software instructions, and the computers may be networked in a client-server arrangement or similar distributed computer network.

Embodiments are described for a physical garbage collection system that uses a memory efficient perfect hash vector to track live segments along with a new duplicate removal algorithm to eliminate the sampling phases required by present GC methods. FIG. 1 illustrates a computer network system that implements one or more embodiments of a large-scale network implementing an efficient or "perfect" physical garbage collection process, under some embodiments. In system 100, a backup server 102 executes a backup management process 112 that coordinates or manages the backup of data from one or more data sources 108 to storage devices, such as network storage 114, client storage 106, and/or virtual storage devices 104. With regard to virtual storage 114, any number of virtual machines (VMs) or groups of VMs may be provided to serve as backup targets, and the target VMs may also be organized into one or more vCenters (virtual centers) representing a physical or virtual network of many virtual machines. The VMs or other network storage devices serve as target storage devices for data backed up from one or more data sources, such as computer 108, which may have attached local storage 118 or utilize networked accessed storage devices 114.

The network server computers are coupled directly or indirectly to the target VMs 104 and 106, and to the data source 108 through network 110, which may be a cloud network, LAN, WAN or other appropriate network. Network 110 provides connectivity to the various systems, components, and resources of system 100, and may be implemented using protocols such as Transmission Control Protocol (TCP) and/or Internet Protocol (IP), well known in the relevant arts. In a distributed network environment, network 110 may represent a cloud-based network environment in which applications, servers and data are maintained and provided through a centralized cloud computing platform. In an embodiment, system 100 may represent a multi-tenant network in which a server computer runs a single instance of a program serving multiple clients (tenants) in which the program is designed to virtually partition its data so that each client works with its own customized virtual application, with each VM representing virtual clients that may be supported by one or more servers within each VM, or other type of centralized network server.

The data generated or sourced by system 100 may be stored in any number of persistent storage locations and devices, such as local client storage, server storage (e.g., 118). The backup process 112 causes or facilitates the backup of this data to other storage devices of the network, such as network storage 114, which may at least be partially implemented through storage device arrays, such as RAID components. In an embodiment network 100 may be implemented to provide support for various storage architectures such as storage area network (SAN), Network-attached Storage (NAS), or Direct-attached Storage (DAS) that make use of large-scale network accessible storage devices 114, such as large capacity disk (optical or magnetic) arrays. In an embodiment, the target storage devices, such as disk array 114 may represent any practical storage device or set of devices, such as fiber-channel (FC) storage area network devices, and OST (OpenStorage) devices. In an embodiment, a one or more dedicated client storage machines 106 may be provided with access to local storage media 116 or an interface to the network storage 114.

The data sourced by the data source may be any appropriate data, such as database data that is part of a database management system. In this case, the data may reside on one or more hard drives (e.g., 118) and may be stored in the database in a variety of formats. One example is an Extensible Markup Language (XML) database, which is a data persistence software system that allows data to be stored in XML format. Another example is a relational database management system (RDMS) which uses tables to store the information. A separate computer 106 may represent a database server that instantiates a program that interacts with the database. Each instance of a database server may, among other features, independently query the database and store information in the database, or it may be an application server that provides user interfaces to database servers, such as through web-based interface applications or through virtual database server or a virtual directory server applications.

In an embodiment, system 100 may represent a Data Domain Restorer (DDR)-based deduplication storage system, and storage server 128 may be implemented as a DDR Deduplication Storage server provided by EMC Corporation. However, other similar backup and storage systems are also possible. System 100 may utilize certain protocol-specific namespaces that are the external interface to applications and include NFS (network file system) and CIFS (common internet file system) namespaces, as well as DD Boost provided by EMC Corporation. In general, DD Boost (Data Domain Boost) is a system that distributes parts of the deduplication process to the backup server or application clients, enabling client-side deduplication for faster, more efficient backup and recovery.

Garbage Collection Processing

As shown in FIG. 1, system 100 includes a perfect physical garbage collection process 120 associated with or executed as part of the backup management process 112. With reference to the backup system of FIG. 1, or similar backup systems, freeing unreferenced space is a basic storage system operation. While there are multiple ways space management is implemented in traditional storage, when a file is deleted, generally blocks referenced from its inodes can be freed immediately by marking a free bitmap or inserting entries into a free list. For deduplicated storage, determining which chunks are referenced has added complexity as a chunk may have numerous references both within a single file and across many files written at various times. While some deduplication methods assumed a First In First Out ("FIFO") deletion pattern, file deletion can generally be in any order.

There are a number of properties to consider when designing and evaluating a garbage collection algorithm: (1) all referenced chunks should be preserved so user data can be retrieved; (2) most unreferenced chunks should be removed to free space; (3) the system should support client reads and writes during garbage collection; and (4) system overheads should be minimized.

Embodiments described herein utilize the fact that most unreferenced chunks should be removed instead of all, since it is often more efficient to focus cleaning on regions that are mostly unreferenced, rather than copying-forward numerous live chunks to reclaim a small amount of space. This is particularly relevant in log-structured storage systems commonly used by deduplicated storage, which tend to exhibit a bimodal distribution of container liveness, where containers tend to be mostly dead or mostly live.

A general garbage collection (GC) procedure can be summarized as follows in terms of steps it performs: (1) enumeration—identify all the live segments; (2) filter—remove duplicate segments—preserve the one with highest container ID; (3) select—compute the liveness of each container and determine the cutoff liveness percentage; and (4) copy—copy forward the live segments from the selected containers.

In many systems, there is not enough memory to track all of the live segments so a sampling procedure is needed to identify a candidate subset of containers before the GC procedure above can be performed. A general GC sampling procedure typically performs the following steps: (1) enumeration—identify all the live segments as limited to a subset of fingerprints; (2) filter—remove duplicate segments; (3) select—estimate the liveness of the containers based on the sampled set of fingerprints; and (4) candidate—insert all the segments of the selected containers into a candidate vector. The GC procedure is then performed on the subset of candidate fingerprints and containers. This means that the GC time is essentially doubled due to the need to perform both the sampling and GC procedures.

In present GC systems, two very large Bloom filters of about equal size are used to track the live segments and the unique live segments. They are called the Live Vector and the Live Instance Vector. During the enumeration phase, GC inserts live references into the live vector based on the fingerprint of the data segment. In one example, same data segments can exist in multiple containers and the live vector does not distinguish these duplicated segments. They are all represented by set of bits in the Bloom filter. In the filter phase, for each fingerprint, the index returns a sequence of (fingerprint, container ID). The index maps a segment fingerprint to the container that contains the segment. In one example, a storage system keeps only the entry with the highest container ID, thus removing all the older duplicated segments. A new key is generated with both the fingerprint and the container ID and the key is inserted into the Live Instance Vector. GC will only consider segments in the Live Instance Vector live and everything else are dead segments that can be cleaned.

In addition to the time overhead mentioned above, this type of system presents significant memory overhead. Due to the memory requirement of these two large Bloom filters, GC often cannot process all the fingerprints in the file system and it has to perform a sampling procedure, which essentially doubles the GC memory requirement.

Figure 2:
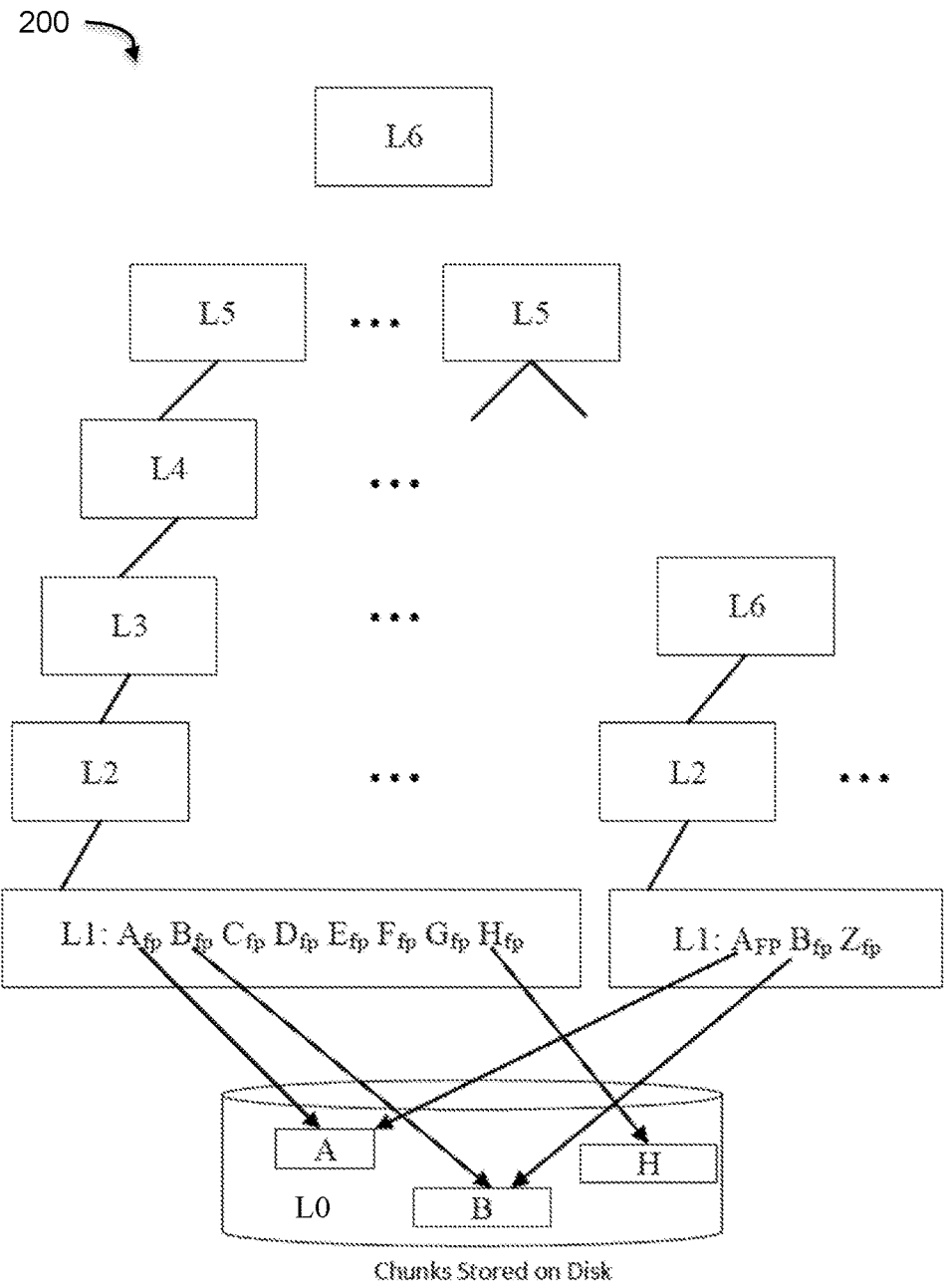
FIG. 2 shows a typical file tree representation in deduplicated storage.

FIG. 2 shows a typical file tree representation 200 in deduplicated storage. The chunks directly written by users are represented as L0, meaning the lowest level of the tree. Consecutive L0 chunks are referenced with an array of fingerprints by an L1 chunk, and an array of L1 fingerprints are referenced by an L2 chunk. This continues up to the top of the tree that we always label L6 for consistency, even if the file is small enough not to need intermediate nodes such as the example on the right side of the figure. The L1-L6 chunks are referred to as LP chunks, where P is a parameter that ranges from 1 to 6 and indicates meta data representing the file. Representing a file in a tree structure of fingerprints covering the lower layers of the tree is often called a Merkle tree. Deduplication takes place because a chunk can be referenced multiple times such as chunks A and B in the example. Though not shown in FIG. 2, LP chunks are themselves stored on disk in containers.

As an example, consider a system with 100 TB of capacity, 10 times deduplication ratio (logical capacity divided by physical capacity), 8 KB L0 chunks, and 20-byte fingerprints. The logical capacity is 1 PB, and since each 8 KB logically written by a client requires a 20-byte fingerprint stored in an L1, the L1 chunks are 2.5 TB, though the upper levels of the tree are smaller. This example highlights that the mark phase cannot be fully performed in memory, as the L1 references should be read from disk. In an embodiment, the system 100 container format includes a metadata section with a list of fingerprints for the chunks within the container. The metadata region is relatively small (a few hundred KB) and can be read more quickly than the full container With reference to FIG. 2, the L0 segments represent user data and are the leaves of the tree. The L6 is the root of the segment tree. Segments from L1 to L6 are referred to as metadata segments or LP segments. They represent the metadata of a file associated with a file tree. An L1 segment is an array of L0 references. Similarly an L2 is an array of L1 references and so on. A segment is considered live if it can be referenced by any live content in the file system. The file system packs the segments into containers that are written to disk in a log-structured manner. Each container is structured into sections. The first section is the metadata section and the following sections are referred to as compression regions. In the metadata section there are all the references or fingerprints that identify the segments in the container. A container manager may be used that is responsible to maintain the log-structured container set and provide a mapping from container identifiers (CID) to block offset on disk. This mapping is entirely stored in memory. The GC process of the file system is responsible for enumerating all live segments in the live content handles of the file system. In a conventional logical enumeration algorithm, which is a depth-first traversal of all the file trees, each file tree is entirely traversed within a single context so that it is possible to roll a checksum from the L0 segments toward the root of the tree and validate the checksum every time a file tree is traversed. In a physical garbage collection process, the enumeration algorithm carries out a breadth-first traversal of all the files in the file system. Thus, the file tree is not used as it does a level-by-level scan of all the trees simultaneously. Hence it cannot roll a per-file-tree checksum that would allow the garbage collector to identify whether any metadata segment is missed which could lead to problems of corruption states in the file system.

Figure 3:
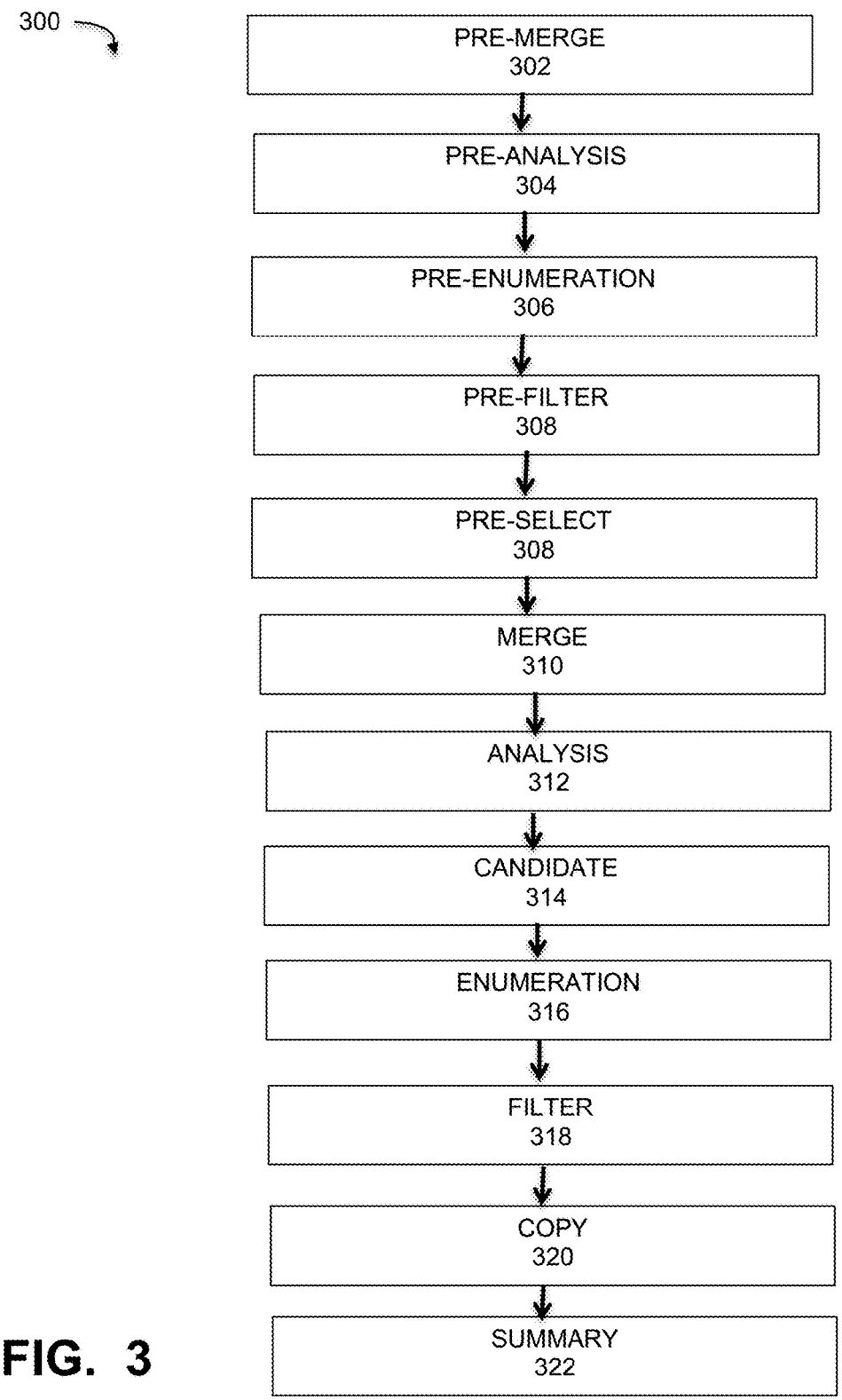
FIG. 3 is a flowchart illustrating method steps for a standard PGC method that is enhanced by certain PPGC techniques under some embodiments.

Physical Garbage Collection (PGC) was developed as a way to address performance issues with earlier Logical Garbage Collection (LGC) systems. Namely, the processing of small files requiring a lot of random reads on the segment tree, high deduplication ratios in the segment trees, and poor locality in the segment trees. FIG. 3 is a flowchart illustrating method steps for a standard PGC method that is enhanced by certain PPGC techniques under some embodiments. As shown in FIG. 3, standard PGC method 300 starts with a pre-merge step 302, in which it dumps the in-memory index to disk; this step may force an index merge. In step 304 it does a pre-analysis in which it walks the Index and creates a perfect hash vector. It then iterates through all files under the namespace in a pre-enumeration step 306, in every segment is added to the live vector if it meets the pre-sampling criteria. In step 308 it does a pre-filter which iterates through the fingerprint index and selects which instance of a given fingerprint should be preserved. One example policy is to preserve the most recently written copy of a fingerprint (i.e., the one stored in the latest container ID). The output of the phase is a bloom filter referred to as Live Instance Vector. In step 310 it does a pre-select that iterates through the containers, and uses the Live Instance Vector to estimate the percentage of the live data in each container. This step calculates the cleaning criteria/thresholds, and marks a container as candidate for cleaning if it meets the cleaning criteria.

Once the pre-phase steps 302 to 310 are performed, the PGC method proceeds with a merge step 312 that is the same as the pre-merge 302 but at a later time. It can be skipped if no sampling is required. It then does an analysis step 312 that walks the index and creates a perfect hash vector. In candidate step 314 it iterates all containers marked in step 308 (pre-filter), and generates a bloom filter referred to as candidate vector with all the fingerprints in the candidate containers. Note that a bloom filter of container IDs is not used because in the next step 316, the system enumerates the namespace and restrict the fingerprints to the candidate set and the file trees do not have the container ID at which a fingerprint is located. The enumeration step 316 is the same as the pre-enumeration 306 but it restricts the fingerprints to the candidate set rather than to the pre-sampling criteria. If no sampling is required, this step is skipped since pre-enumeration can consider all fingerprints. The filter step 318 is the same as pre-filter but it restricts the fingerprints to the candidate set rather than to the pre-sampling criteria. If no sampling is required, this phase is skipped. Copy step 320 copies all the candidate containers forward and use the Live Instance Vector to filter the segments that are being copied; and the summary step 322 rebuilds the summary vector whenever there is one for the corresponding backup system (e.g., DDR) model.

With respect to the enumeration algorithm for PGC, instead of traversing the segment tree of each file, PGC traverses the segment tree level by level. There may be up to 6 levels of the segment tree in certain backup systems (e.g., DD File System). PGC first traverses the namespace to identify all the live L6 (level 6) segments and insert them into the live vector. Then it scans the containers and reads all the live L6 segments and inserts all the L5 references into the live vector. The process is repeated until PGC has inserted all the live L0 references into the live vector. This algorithm always perform sequential read of the containers and it does not repeat reading the same container in case of high de-duplication ratio. PGC makes use of the perfect hash vector to track all the fingerprints in the segment tree up to the level. This perfect hash vector does not replace the live vector. The perfect hash vector can represent a known subset of fingerprints in the file system uniquely, i.e., there is no collision in the LP segments. The uniqueness property also allows PGC to compute a level by level checksum of the parent and child fingerprints to verify the consistency in the segment tree, which is implicit in the LGC algorithm. The memory requirement of the perfect hash vector in PGC is, for example, about 4.5 bits per fingerprint because it has to track 3 different states for each fingerprint. A simple perfect hash vector (without the consistency feature) only requires, for example, 2.8 bits per fingerprint. There is a cost to build the perfect hash vector. All the fingerprints in the system must be read and analyzed to build the hash functions. This process can take several hours. A significant problem with general PGC, is that sampling is still required on most customers' systems, which means that the system must run pre-phase operations, and the GC cycle is long.

Perfect Physical Garbage Collection

To overcome the sampling requirement and attendant processing/time overhead associated with PGC systems, embodiments of system 100 include a Perfect Physical Garbage Collection ("PPGC") process that uses perfect hash vectors instead of large Bloom filters of the PGC process for the live and live instance vectors and consolidates both these vectors into a single Live Vector using a single perfect hash vector.

Figure 4:
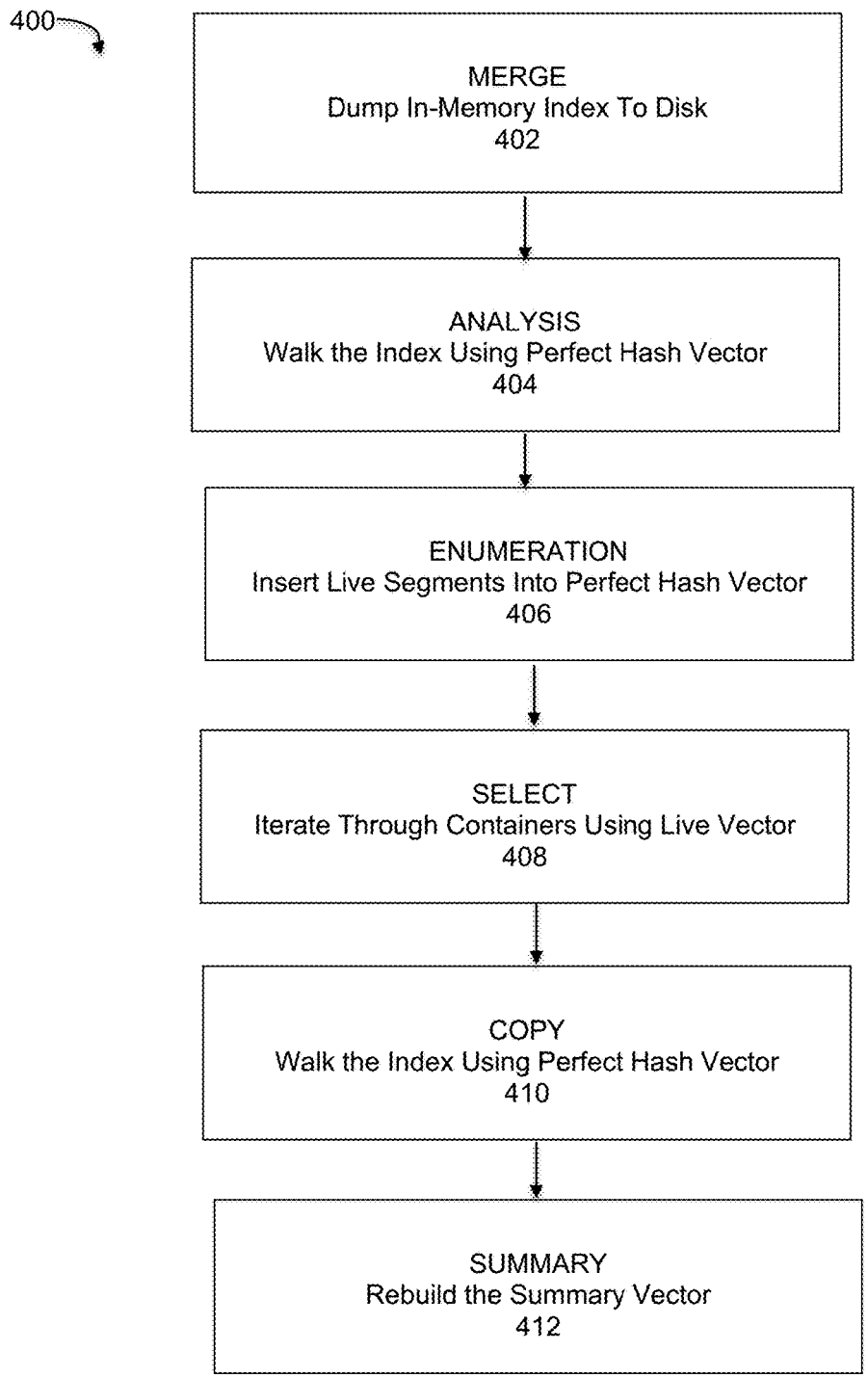
FIG. 4 is a flowchart illustrating method steps for a PPGC method, under some embodiments.

FIG. 4 is a flowchart illustrating method steps for a PPGC method, under some embodiments. Process 400 begins with a merge step 402 that dumps the in-memory index to disk (this step may force an index merge). In the analysis step 404, it walks the index that contains the mapping of fingerprints to the container ID and builds a perfect hash function for both the walk vector and the live vector. A walk vector is used to assist a breadth-first search of the file segment trees instead of doing per file depth-first scans. It consists of a walk bit to indicate the segment is walked and a confirm bit to confirm that the segment is read during container scans for each level. A depth-first scan results in random I/O on disk for file metadata (Lps). To do a breadth-first scan, the process performs a series of sequential container scans, one scan for each level L6 to L1. It first records the live L6 fingerprints in the PHV based on files referenced in the namespace by setting a walk bit. In an embodiment, the system has an in-memory structure that records which Lp types (L6, L5, L0) exist in each container, so it can specifically scan containers with L6 chunks. If the L6 is marked as walk in the perfect hash vector, the confirm bit is marked, and the process then parses the L5 fingerprints stored in the L6 and sets the walk bits for those entries in the perfect hash vector. These steps are then repeated for scanning for L5 chunks, L4 chunks, and so on, until the L1 chunks are read.

For PPGC, the walk vector is similar to that used for PGC, but the Live Vector is a perfect hash vector, instead of the Bloom filter used in PGC. This step builds a per container duplicate counter at the same time. The duplicate count table keeps a mapping of <container ID, duplicate count>, where duplicate count is the number of segments in the container that have duplicates across the system. In enumeration step 406, the process iterates through all files under the namespace, and for every segment, the process adds it to the live vector. This step is similar to the PGC process, but here live segments are inserted in the perfect hash vector rather than the Bloom filter. The select step 408 iterates through the containers and uses the live vector and the duplicate counter to estimate the liveness of the container. It also calculates the true liveness of the container by considering the duplicates. Embodiments of duplicate estimation are described in co-pending U.S. application Ser. No. 15/389,429, entitled "Dynamic Duplication Estimation for Garbage Collection," which is hereby incorporated by reference. In copy step 410, the process copies the live segment out of the selected containers. The process 400 ends with a summary step 322 that rebuilds the summary vector whenever there is one for the corresponding backup system (e.g., DDR) model.

As stated above, the PPGC process primarily distinguishes over the PGC process by using perfect hash vectors instead of Bloom filters for the Live Vector. In general, a perfect hash function is a collision free hash function that maps a set of keys of size n to a range of size m where m>n (m=1.43*n). For example, it only requires 2.8 bits per key in a data domain implementation, and is thus is much more compact than the Bloom filter, which requires 6 bits per fingerprint. However use of the perfect hash vector requires that the hash function should be pre-computed using the entire set of keys first and any key not in the initial set can cause collision. A description of perfect hash functions that provides background for the derivation of the 2.8 bits/fp possible in the PPGC system may be found in "Hash, Displace, and Compress" by Djamal Belazzougui, Fabiano Botelho, and Martin Dietzfelbinger (http:/cmph.sourceforge.net/papers/esa09.pdf).

In an embodiment, the PPGC process of FIG. 4 follows the same physical enumeration algorithm as PGC. It replaces the live vector bloom filter by a simple perfect hash live vector (2.8 bit per fingerprint). The smaller memory footprint and the elimination of the live instance vector allows PPGC to handle 6/2.8*2=4.28 times more fingerprints, so that the sampling procedure is no longer needed.

With regard to duplicate removal, duplicates are removed in the copy phase. Each time a segment is copied forward or left behind, the segment will be deleted from the live vector by flipping the bit in the perfect hash vector. Subsequent lookup of the same segment will return a dead status and the segment will be removed. If the copy phase begins from the highest container ID, essentially it will preserve the segment with the highest container ID and remove all the duplicates in the lower containers. This algorithm is not possible had the live vector been implemented as a Bloom filter because different live segments can collide and removal of one will cause the other one to become dead as well, but the perfect hash vector is collision free.

Figure 5:
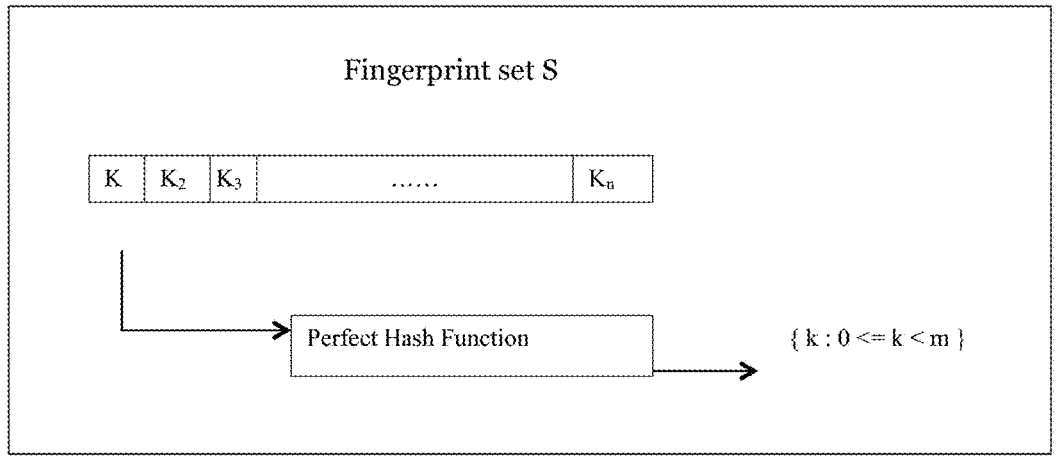
FIG. 5 illustrates a Perfect Hash Function for a fingerprint set that can be used in conjunction with certain embodiments.

FIG. 5 illustrates a perfect hash function for a fingerprint set that can be used in conjunction with certain embodiments. The perfect hash function phf( ) has the following representation:

$$phf(x)=(f(x)+a_{i(x)}h(x)+b_{i(x)})\% \ m$$

$$i(x)=g(x)\% \ r$$

where f, g, h are uniform hash functions; r is the number of hash buckets in the perfect hash function and a, b are constants that depend on the bucket. The size of the function can be written as:

$$|PH_{vec}|=|PHF|+|\text{Bit vector}|$$

where |PHF| is the space required to store the per bucket constants.

Figure 6:
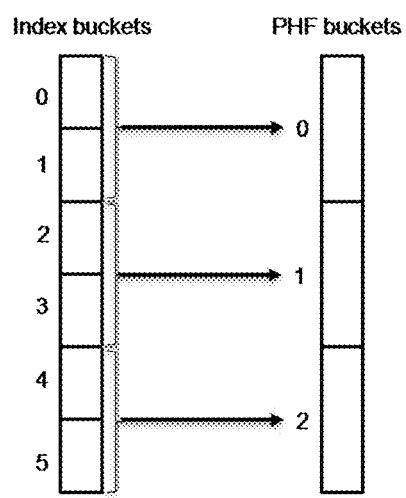
FIG. 6 illustrates a correlation of index buckets to PHF buckets, under an embodiment.

The index is further subdivided into multiple partitions such that all the fingerprints in each partition can fit in memory in order to build the perfect hash function for that subset of fingerprints. FIG. 6 illustrates a correlation of index buckets to PHF buckets, under an embodiment.

Figure 7:
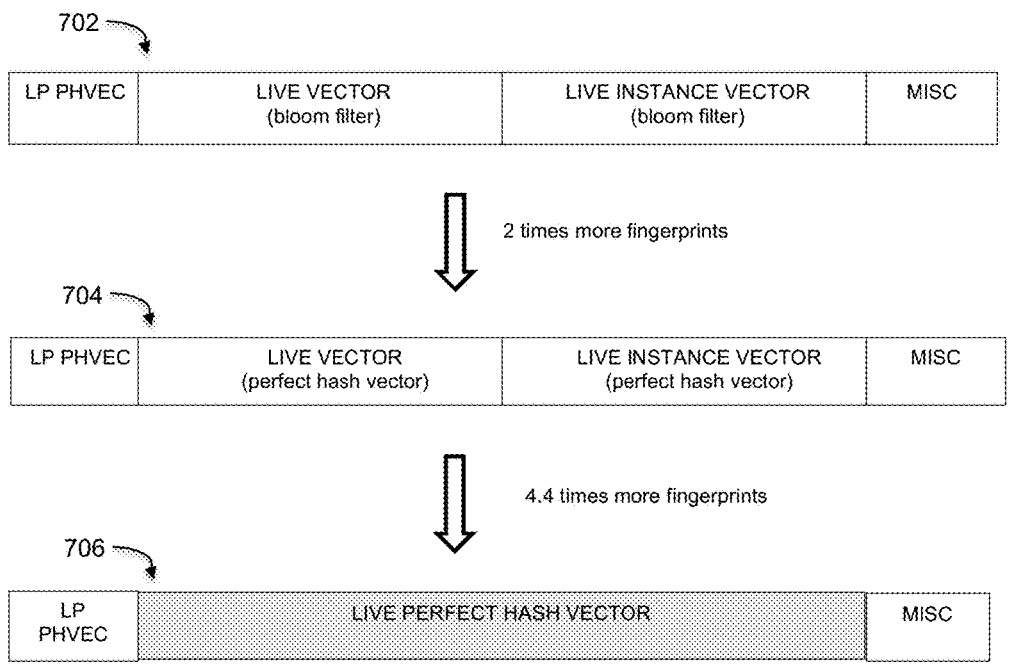
FIG. 7 illustrates a composition of the Live and Live Instance vectors for GC, PGC, and PPGC processes under some embodiments.

In the regular non-sampling phases of GC, all the GC memory is allocated for three very large data structures: (1) A perfect hash vector for LP segments ("LP PHVEC"); (2) A Live Vector (block bloom filter) for all the live fingerprints; and (3) A Live Instance Vector (block Bloom filter) to filter the duplicates. This structure is illustrated in data element 702 of FIG. 7, where FIG. 7 illustrates a composition of the Live and Live Instance vectors for GC, PGC, and PPGC processes under some embodiments. In FIG. 7, the element labeled "MISC" may include a collision-tracking Bloom filter (described in greater detail below), a live duplicate counter, copy buffers, and other similar elements.

In an example implementation, the PGC process allocates 6 bits per fingerprints to maintain a collision rate of 7% in the block Bloom filter. If N is the number of fingerprints in the system, the memory required for the live vector to support all N fingerprints would be N*6/8 bytes. On a large scale data domain system, the theoretical maximum number of fingerprints might be on the order of 135 billion with two times (2×) compression, which would require 135 billion*6/8=101 GB of memory. That means 202 GB for both the live vector and the live instance vector.

In an embodiment of the PPGC system, Bloom filters of the PGC block 702 for the Live Vector and the Live Instance Vector are replaced by perfect hash vectors, as shown in data element 704 of FIG. 7. This means they can support more than two times (2×) the number of fingerprints as it takes only 2.8 bits per fingerprint to build the perfect hash vector.

In an embodiment, the PPGC process adopts a dynamic duplicate removal algorithm in the copy phase which does not require the Live Instance Vector, as shown in data element 706 of FIG. 7. This allows PPGC to support 4.2 to 4.4 times more fingerprints than PGC. In certain systems, this is enough to eliminate the sampling phases on all platforms and ASUP data also supports this conclusion.

The time required to build the live perfect hash vector would be prohibitive if a single thread is used to scan the index one bucket at a time. In an embodiment, multi-threading is used so that this index scan can be completed in a relatively short time.

Duplicate Removal

In general, among a plurality of fingerprints pointing to the same block locations, all fingerprints (e.g., FP1, FP2 and FP3) are considered live only if any one of them is live. However, the dynamic duplicate removal algorithm requires clearing the liveness bits in the live vector. Removing the liveness bit can make all of the fingerprints dead, which is a potential false negative scenario that can cause data corruption. Embodiments of the PPGC process includes mechanisms that help ensure that no data corruption can occur in this kind of situation.

Figure 8:
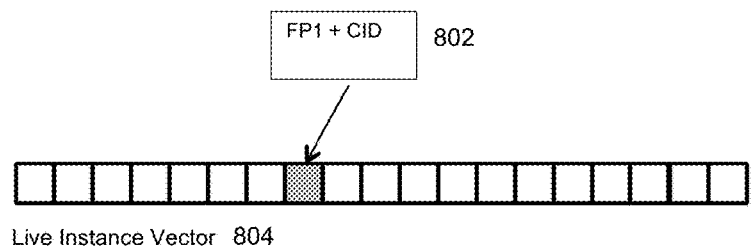
FIG. 8 illustrates an example of how a live instance vector in PGC is used to track the unique live segments.

FIG. 8 illustrates an example of how a live instance vector 804 in PGC is used to track the unique live segments. Fingerprints can be XOR'ed with the highest container ID (CID) 802 that contains the fingerprint to form the key for this vector. All fingerprints in older containers of the live instance vector 804 can be considered dead.

While this live instance vector gives very precise information about the duplicates, it requires 6 bits per fingerprint. If there are N containers and 1024 segments in each L0 container, that consumes N*1024*6/8 bytes of memory.

In PPGC process of FIG. 1, this live instance vector is not present. Duplicates can be removed by a combination of a per-container live duplicate counter and a dynamic duplicate removal algorithm in the copy phase. Only two bytes may be needed for each container to track the number of live duplicates. The live duplicate counter keeps track of the number of live duplicates in each container. By subtracting the number of live segments with this live duplicate count, the true liveness of the container is obtained, which allows the building of the liveness histogram and computing the cutoff point as follows:

live segments−#live segments that are duplicates=#live segments without duplicates Duplicates can be removed dynamically in the copy forward procedure. Containers can be copied forward starting with the highest CID. The same algorithm can work if it starts from the lowest CID, except that duplicate segments with the lowest CID can be preserved. For each live segment copied forward or left behind, the fingerprint can be cleared from the live vector dynamically. Subsequent duplicates of those segments can be discarded because they can be considered dead once the bit is cleared.

Figure 9A:
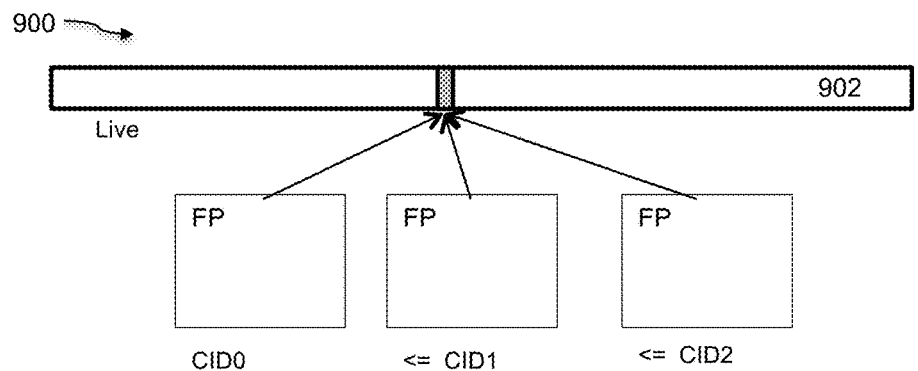
FIGS. 9A and 9B illustrate a copy forward procedure on an example segment of a Live Vector, under some embodiments.

One major distinction between PGC and PPGC is that in PPGC, the live duplicate segments are not known. In order to preserve the newest segments, the copy forward phase will be performed starting from the highest CID and then move backwards towards the lowest CID. Each time a segment is copied forward, all subsequent segments with the same fingerprint are duplicates. Therefore, the liveness bit of that segment can be cleared in the live vector, meaning that essentially the segment is now dead. The diagram of FIG. 9A illustrates an example of this procedure. As shown in FIG. 9A, the copy forward phase starts with the highest CID, which is CID2, and then moves backward to CID0. Each time a segment is copied forward, all subsequent segments of Live Vector 902 with the same fingerprint (FP) are duplicates.

Figure 9B:
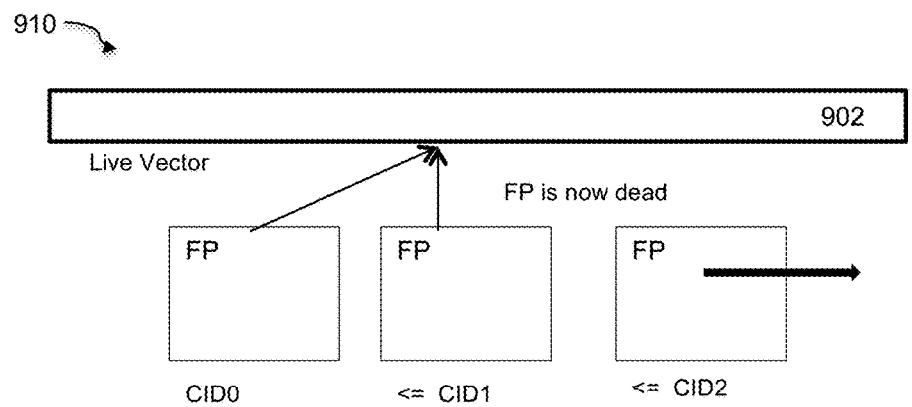

Diagram 910 in FIG. 9B illustrates the situation where the fingerprint (FP) in CID2 is copied forward. In the copy phase, live segments in the candidate containers can be copied forward and all the segments (live or dead) in the non-candidate containers can be untouched and left behind. For the sake of simplicity, the term "copied forward" means copied forward or left behind whenever it makes sense.

The clearing of the liveness bit works because perfect hash vector maps each fingerprint uniquely to the vector. If a Bloom filter is used, removal of a liveness bit can also kill all other fingerprints that map to the same bit, which can cause missing segments. It should be noted that even a container is not a candidate, its meta data should still be read to perform the duplicate removal for all live segments that can be left behind in the container.

For the embodiments described herein, a perfect hash vector replaces the Bloom filter for the Live Vector. This perfect hash vector can be built in a short time using multi threads in parallel. The existing LP perfect hash vector can still be preserved for LP verification. The entire index is scanned only once to build perfect hash functions for both the LP vector and the Live Vector.

System Implementation

Embodiments of the processes and techniques described above can be implemented on any appropriate backup system operating environment or file system, or network server system. Such embodiments may include other or alternative data structures or definitions as needed or appropriate.

Figure 10:
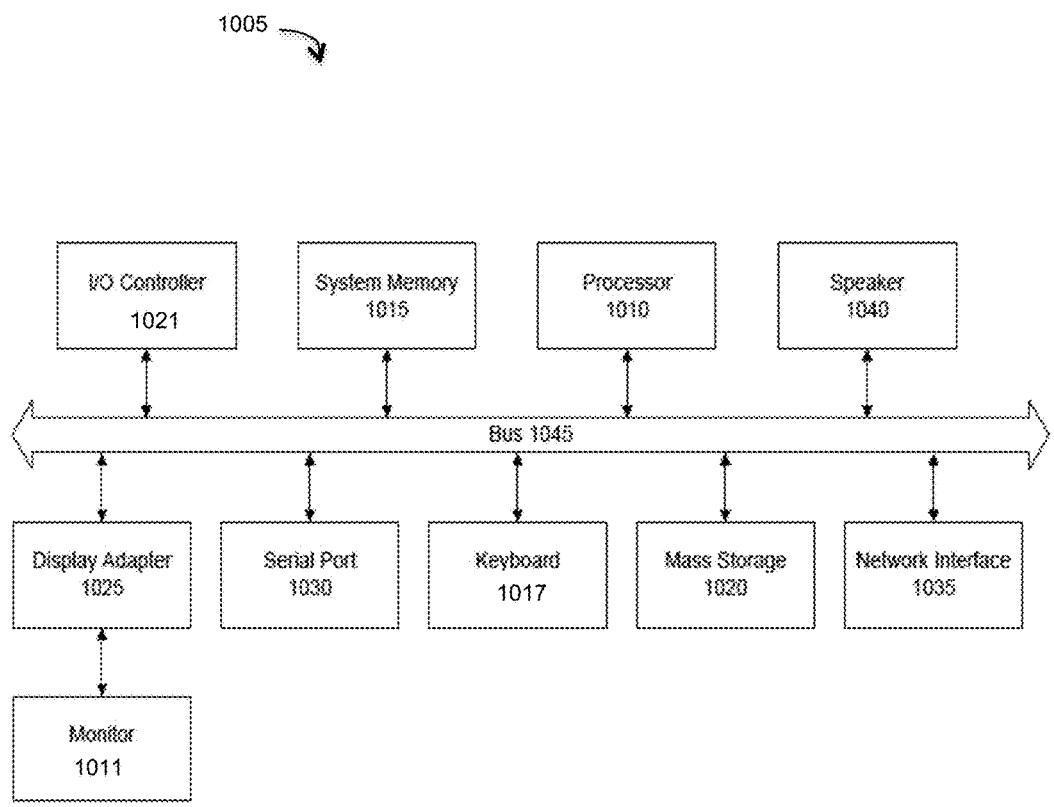
FIG. 10 is a system block diagram of a computer system used to execute one or more software components of the PPGC process, under some embodiments.

The network of FIG. 1 may comprise any number of individual client-server networks coupled over the Internet or similar large-scale network or portion thereof. Each node in the network(s) comprises a computing device capable of executing software code to perform the processing steps described herein. FIG. 10 shows a system block diagram of a computer system used to execute one or more software components of the present system described herein. The computer system 1005 includes a monitor 1011, keyboard 1017, and mass storage devices 1020. Computer system 1005 further includes subsystems such as central processor 1010, system memory 1015, input/output (I/O) controller 1021, display adapter 1025, serial or universal serial bus (USB) port 1030, network interface 1035, and speaker 1040. The system may also be used with computer systems with additional or fewer subsystems. For example, a computer system could include more than one processor 1010 (i.e., a multiprocessor system) or a system may include a cache memory.

Arrows such as 1045 represent the system bus architecture of computer system 1005. However, these arrows are illustrative of any interconnection scheme serving to link the subsystems. For example, speaker 1040 could be connected to the other subsystems through a port or have an internal direct connection to central processor 1010. The processor may include multiple processors or a multicore processor, which may permit parallel processing of information. Computer system 1005 shown in FIG. 10 is but an example of a computer system suitable for use with the present system. Other configurations of subsystems suitable for use with the present invention will be readily apparent to one of ordinary skill in the art.

Computer software products may be written in any of various suitable programming languages. The computer software product may be an independent application with data input and data display modules. Alternatively, the computer software products may be classes that may be instantiated as distributed objects. The computer software products may also be component software.

An operating system for the system may be one of the Microsoft Windows®. family of systems (e.g., Windows Server), Linux, Mac OS X, IRIX32, or IRIX64. Other operating systems may be used. Microsoft Windows is a trademark of Microsoft Corporation.

Furthermore, the computer may be connected to a network and may interface to other computers using this network. The network may be an intranet, internet, or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, 802.11n, 802.11ac, and 802.11ad, just to name a few examples), near field communication (NFC), radio-frequency identification (RFID), mobile or cellular wireless. For example, signals from a computer may be transferred, at least in part, wirelessly to components or other computers.

In an embodiment, with a web browser executing on a computer workstation system, a user accesses a system on the World Wide Web (WWW) through a network such as the Internet. The web browser is used to download web pages or other content in various formats including HTML, XML, text, PDF, and postscript, and may be used to upload information to other parts of the system. The web browser may use uniform resource identifiers (URLs) to identify resources on the web and hypertext transfer protocol (HTTP) in transferring files on the web.

In other implementations, the user accesses the system through either or both of native and nonnative applications. Native applications are locally installed on the particular computing system and are specific to the operating system or one or more hardware devices of that computing system, or a combination of these. These applications can be updated (e.g., periodically) via a direct internet upgrade patching mechanism or through an applications store (e.g., Apple iTunes and App store, Google Play store, and Windows Phone App store).

The system can run in platform-independent, nonnative applications. For example, client can access the system through a web application from one or more servers using a network connection with the server or servers and load the web application in a web browser. For example, a web application can be downloaded from an application server over the Internet by a web browser. Nonnative applications can also be obtained from other sources, such as a disk.

For the sake of clarity, the processes and methods herein have been illustrated with a specific flow, but it should be understood that other sequences may be possible and that some may be performed in parallel, without departing from the spirit of the invention. Additionally, steps may be subdivided or combined. As disclosed herein, software written in accordance with the present invention may be stored in some form of computer-readable medium, such as memory or CD-ROM, or transmitted over a network, and executed by a processor. More than one computer may be used, such as by using multiple computers in a parallel or load-sharing arrangement or distributing tasks across multiple computers such that, as a whole, they perform the functions of the components identified herein; i.e. they take the place of a single computer. Various functions described above may be performed by a single process or groups of processes, on a single computer or distributed over several computers. Processes may invoke other processes to handle certain tasks. A single storage device may be used, or several may be used to take the place of a single storage device.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

All references cited herein are intended to be incorporated by reference. While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A computer-implemented perfect physical garbage collection method for use in a deduplication backup system, comprising:
    walking, in an analysis phase, an index containing a mapping of fingerprints to a container ID for a plurality of containers and building a perfect hash function for a walk vector and a live vector, wherein the live vector uses a perfect hash vector to form a perfect hash live vector;
    inserting, in an enumeration phase, live segments in memory into the perfect hash vector;
    traversing the plurality of containers, in a select phase, and selecting containers that meet a defined liveness threshold; and
    copying forward, in a copy phase, live segments out of the selected containers.

2. The method of claim 1 further comprising performing a dynamic duplicate removal process in the copy phase, wherein whenever a segment is copied forward or left behind, the segment is deleted from the live vector.

3. The method of claim 2 wherein a subsequent look up to the segment will return a dead status and the segment will be removed.

4. The method of claim 3 wherein the dynamic duplicate removal process preserves newest segments by starting from a highest container ID and moving backward toward a lowest container ID, and provides that each time a segment is copied forward, all subsequent segments with an identical fingerprint are considered duplicates so that a liveness bit of the segment can be cleared in the live vector to mark the segment as dead.

5. The method of claim 4 further comprising maintaining the perfect hash live vector in a four field data structure including the perfect hash vector, a duplicate counter and a miscellaneous data field.

6. The method of claim 1 further comprising using a perfect hash function a walk vector that is used to assist a breadth-first search of file segment trees to prevent a need to perform per file depth-first scans.

7. The method of claim 6 wherein the walk vector comprises a walk bit to indicate the segment is walked and a confirm bit to confirm that the segment is read during container scans for each level.

8. The method of claim 1 wherein the deduplication backup system comprises a Data Domain file system.

9. A system implementing perfect physical garbage collection (PPGC) within a deduplication backup network, comprising:
   a fingerprint set;
   a mapping of fingerprints to a container ID for a plurality of containers;
   a data structure including a perfect hash vector, a duplicate counter and a miscellaneous data field, wherein the perfect hash vector is built using a perfect hash function for a live vector to form a perfect hash live vector to track all fingerprints in a segment tree up to a defined level.

10. The system of claim 9 wherein the miscellaneous data field holds copy buffers, the collision tracking Bloom filter, and a dead vector.

11. The system of claim 10 further comprising a processing unit performing a garbage collection method comprising:
   an analysis phase walking an index containing a mapping of fingerprints to a container ID for a plurality of containers and building a perfect hash function for a walk vector and a live vector, wherein the live vector uses a perfect hash vector to form a perfect hash live vector;
   an enumeration phase inserting live segments in memory into the perfect hash vector;
   a select phase traversing the plurality of containers and selecting containers that meet a defined liveness threshold; and
   a copy phase copying forward live segments out of the selected containers.

12. The system of claim 11 further comprising an additional processing component performing a dynamic duplicate removal process in the copy phase, wherein whenever a segment is copied forward or left behind, the segment is deleted from the live vector, and wherein a subsequent look up to the segment will return a dead status and the segment will be removed.

13. The system of claim 12 wherein the dynamic duplicate removal process preserves newest segments by starting from a highest container ID and moving backward toward a lowest container ID, and provides that each time a segment is copied forward, all subsequent segments with an identical fingerprint are considered duplicates so that a liveness bit of the segment can be cleared in the live vector to mark the segment as dead.

14. The system of claim 9 further comprising using a perfect hash function a walk vector that is used to assist a breadth-first search of file segment trees to prevent a need to perform per file depth-first scans.

15. The system of claim 14 wherein the walk vector comprises a walk bit to indicate the segment is walked and a confirm bit to confirm that the segment is read during container scans for each level.

16. A computer program product, comprising a non-transitory computer-readable medium having a computer-readable program code embodied therein, the computer-readable program code adapted to be executed by one or more processors to implement a method of performing perfect physical garbage collection for use in a deduplication backup system, by:
   walking, in an analysis phase, an index containing a mapping of fingerprints to a container ID for a plurality of containers and building a perfect hash function for a walk vector and a live vector, wherein the live vector uses a perfect hash vector to form a perfect hash live vector;
   inserting, in an enumeration phase, live segments in memory into the perfect hash vector;
   traversing the plurality of containers, in a select phase, and selecting containers that meet a defined liveness threshold; and
   copying forward, in a copy phase, live segments out of the selected containers.

17. The computer program product of claim 16, wherein the method further comprises performing a dynamic duplicate removal process in the copy phase, wherein whenever a segment is copied forward or left behind, the segment is deleted from the live vector.

18. The computer program product of claim 17 wherein a subsequent look up to the segment will return a dead status and the segment will be removed.

19. The computer program product of claim 18 wherein the dynamic duplicate removal process preserves newest segments by starting from a highest container ID and moving backward toward a lowest container ID, and provides that each time a segment is copied forward, all subsequent segments with an identical fingerprint are considered duplicates so that a liveness bit of the segment can be cleared in the live vector to mark the segment as dead.

20. The computer program product of claim 15 wherein the method further comprises maintaining the perfect hash live vector in a four field data structure including the perfect hash vector, a duplicate counter and a miscellaneous data field.

* * * * *